United States Patent
Okajima et al.

(10) Patent No.: US 10,407,583 B2
(45) Date of Patent: Sep. 10, 2019

(54) INK FOR SURGICAL MARKER

(71) Applicant: PLATINUM PEN CO., LTD., Tokyo (JP)

(72) Inventors: Yoshikazu Okajima, Tokyo (JP); Akihito Takahashi, Koshigaya (JP)

(73) Assignee: PLATINUM PEN CO., LTD., Tokyo (JP)

( * ) Notice: Subject to any disclaimer, the term of this patent is extended or adjusted under 35 U.S.C. 154(b) by 0 days.

(21) Appl. No.: 15/540,301

(22) PCT Filed: Sep. 28, 2015

(86) PCT No.: PCT/JP2015/078127
§ 371 (c)(1),
(2) Date: Jun. 28, 2017

(87) PCT Pub. No.: WO2016/111060
PCT Pub. Date: Jul. 14, 2016

(65) Prior Publication Data
US 2018/0022948 A1 Jan. 25, 2018

(30) Foreign Application Priority Data
Jan. 7, 2015 (JP) ................... 2015-001523

(51) Int. Cl.
*C09D 11/17* (2014.01)
(52) U.S. Cl.
CPC .................... *C09D 11/17* (2013.01)
(58) Field of Classification Search
USPC ........... 523/105, 161; 106/31.13, 31.2, 31.75
See application file for complete search history.

(56) References Cited

U.S. PATENT DOCUMENTS

| 5,069,719 A * | 12/1991 | Ono ................. C09D 11/17 106/170.1 |
| 5,170,799 A * | 12/1992 | Nagase ............ A61B 10/0045 128/897 |
| 7,071,245 B2 * | 7/2006 | Ichikawa ............ C09D 11/18 401/209 |
| 2013/0197358 A1 | 8/2013 | Gurtner |

FOREIGN PATENT DOCUMENTS

| JP | 60186573 A * | 9/1985 |
| JP | H63-44788 B2 | 9/1988 |
| JP | 2002-138237 A1 | 5/2002 |
| JP | 2005-036173 A1 | 2/2005 |
| JP | 3132715 U | 6/2007 |

OTHER PUBLICATIONS

Machine translated JP 2002-138237 (May 14, 2002), Japan, 6 pages.*
International Search Report for International Application No. PCT/JP2015/078127 dated Nov. 24, 2015.

* cited by examiner

*Primary Examiner* — Tae H Yoon
(74) *Attorney, Agent, or Firm* — Kratz, Quintos & Hanson, LLP

(57) ABSTRACT

A precise, quick mark showing a surgical operation site is allowed to put on a marking target irrespective of the skin or a surgical drape attached onto the skin in surgical operation. An ink for a surgical marker is made of isopropyl alcohol as a solvent, polyvinyl pyrrolidone involved in film formation, and methylrosanilinium chloride as a pigment, and, in particular, the content of the polyvinyl pyrrolidone is set to be greater than or equal to 2% but smaller than or equal to 12%. The composition described above allows the ink to be smoothly discharged and a film containing the pigment to be quickly formed and adhered as the ink dries. A mark can therefore be put in a precise, quick manner irrespective of a marking target, the skin or a surgical drape attached onto the skin.

5 Claims, No Drawings

INK FOR SURGICAL MARKER

CROSS-REFERENCE TO RELATED APPLICATIONS

This patent application is a 371 of PCT/JP2015/078127, filed Sep. 28, 2015, and claims priority to Japanese Patent Application No. 2015-001523, filed on Jan. 7, 2015, the disclosures of which are expressly incorporated by reference herein in their entirety.

TECHNICAL FIELD

The invention of the present application relates to a composition of an ink for a surgical marker used to put a mark showing a surgical operation site on the skin or a surgical drape attached onto the skin, for example, in surgery.

BACKGROUND ART

Since the surgical marker described above typically puts a mark showing a surgical operation site directly on the skin, the composition of an ink for the surgical marker is restricted to a chemical registered in Japanese Pharmacopoeia.

The composition of the ink for the surgical marker is therefore made of a pigment, such as crystal violet, an alcohol-based solvent that solves the pigment, such as isopropyl alcohol, and propylene glycol, which is an auxiliary adjuster that prevents the skin from drying due to the alcohol-based solvent and adjusts the viscosity of the ink (see Technical Literature 1).

In recent years, to prevent infectious diseases particularly due, for example, to a splash of blood or body fluid, surgical operation is performed in some cases with a surgical drape made of polyethylene attached onto a surgical operation site in advance.

In this case, when a surgical marker that puts a mark directly on the skin is used to attempt marking showing a surgical operation site on the drape, the surgical marker ink of related art described above tends to be repelled because the pigment does not penetrate the drape. Further, since the propylene glycol, which is one of the components of the ink, makes it difficult for the ink to dry, the mark undesirably blurs and could be an incorrect mark.

The incorrect mark then adversely affects the surgical operation.

CITATION LIST

Patent literature

Patent Literature 1: Japanese Patent Laid-Open No. 63-44788

SUMMARY OF INVENTION

Technical Problem

An object to be achieved is to allow precise, quick marking showing a surgical operation site not only on the skin but also on a surgical drape attached onto the skin with no blur of the mark.

Solution to Problem

The invention of the present application is most primarily characterized in that an ink for a surgical marker used in surgical operation contains polyvinyl pyrrolidone as a resin material involved particularly in film formation.

As a first feature, the ink is made of polyvinyl pyrrolidone that serves as a resin material involved in film formation, isopropyl alcohol, ethanol, and benzyl alcohol that serves as a solvent of the resin material and is registered in Japanese Pharmacopoeia, and methylrosanilinium chloride that serves as a pigment and is registered in Japanese Pharmacopoeia.

Therefore, when a mark showing a surgical operation site is put in surgical operation, the polyvinyl pyrrolidone solved in the alcohol described above, which is the solvent, forms a thin film colored by the pigment described above and adheres to the surgical operation site at the same time when the mark is put and the solvent is evaporated. As a result, the colored thin film allows precise, quick marking showing the surgical operation site although the portion where a mark formed of the ink for a surgical marker has been put is the skin or a surgical drape made of polyethylene and attached onto the skin.

Specific appropriate examples of the alcohol used as the solvent of the resin material described above include isopropyl alcohol, ethanol, and benzyl alcohol.

As a second feature in addition to the first feature, a content of the polyvinyl pyrrolidone as the resin material involved in film formation is greater than or equal to 2% but smaller than or equal to 12%.

Therefore, since the polyvinyl pyrrolidone as the resin material involved in film formation is uniformly solved in the alcohol described above, which is the solvent in the ink for a surgical marker, with adequate viscosity maintained, the ink is smoothly discharged from the surgical marker when a mark is put. After the marking, the ink dries when the alcohol described above, which is the solvent, is evaporated, quickly forms a colored thin film, and adheres to the marking site. As a result, a mark can be put in a precise, quick manner not only on the skin but also on a surgical drape.

When the content of polyvinyl pyrrolidone as the resin material involved in film formation is smaller than 2%, the film formation is incomplete, and the pigment penetrates the skin or the surgical drape. In this case, smear is likely to occur, and a mark showing a surgical operation site could not be precisely put.

When the content of polyvinyl pyrrolidone is greater than 12%, the viscosity of the ink for a surgical marker undesirably increases. In this case, smooth discharge of the ink from the surgical marker is obstructed when a mark is put. Therefore, blur is likely to occur, and the mark cannot be quickly put.

Advantageous Effect of the Invention

The ink for a surgical marker according to the invention of the present application allows precise, quick marking showing a surgical operation site irrespective of a marking target, the skin or a surgical drape, allowing a surgeon to quickly start surgical operation. The ink therefore provides an excellent effect of increasing the probability of saving of a human life.

DESCRIPTION OF EMBODIMENT

To allow precise, quick marking showing a surgical operation site irrespective of a marking target, the skin or a surgical drape attached onto the skin, an ink for a surgical marker particularly contains a predetermined amount of polyvinyl pyrrolidone as a resin material involved in film formation.

EXAMPLES

A surgical marker ink that is the embodiment of the invention of the present application is prepared as described below. In the description of the following examples, isopropyl alcohol and methylrosanilinium chloride (hereinafter referred to as "crystal violet") are specifically presented as an alcohol and the pigment, respectively, used in the invention of the present application.

First, polyvinyl pyrrolidone (hereinafter referred to as "PVP" in the examples), which is a resin material involved in shaping a predetermined amount of film, is added to isopropyl alcohol, which is a measured amount of solvent, and the mixture is then sufficiently stirred.

Crystal violet, which is a fixed amount of pigment, is then added to the mixture described above, and the resultant mixture is then sufficiently stirred again, followed by filtration.

As the surgical marker ink prepared as described above, which is the embodiment of the invention of the present application, Examples 1 to 5, in which the content of PVP varies as appropriate over the range from 2 to 12% (samples Nos. 3 to 7), were compared with Comparative Examples, in which the content of PVP is smaller than 2% or greater than 12% (samples Nos. 1, 2, and 8), and effects of the invention were checked (see Table 1).

To check the effects of the surgical marker ink that is the embodiment of the invention of the present application, "tint," "smear," and "blur" were visually checked as performance of marking on a surgical drape, and the performance was further evaluated with reference to the filtration speed at the time of sample preparation, which relates to the viscosity of the ink.

to excel in "tint," "smear," and "blur" relating to the basic performance of marking on a surgical drape except the filtration speed, which is required particularly from the viewpoint of workability in the manufacturing steps and does not greatly affect smooth protrusion of the ink when the PVP concentration is greater than or equal to 2% but smaller than or equal to 12%.

The invention claimed is:

1. An ink for a surgical marker, consisting of:
   polyvinyl pyrrolidone that serves as a resin material involved in film formation,
   an alcohol, selected from the group consisting of isopropyl alcohol, ethanol, and benzyl alcohol, that serves as a solvent of the resin material and is registered in Japanese Pharmacopoeia, and
   methylrosanilinium chloride that serves as a pigment and is registered in Japanese Pharmacopoeia.

2. The ink for a surgical marker according to claim 1, characterized in that a content of the polyvinyl pyrrolidone as the resin material involved in film formation is greater than or equal to 2% but smaller than or equal to 12%.

3. An ink, consisting of:
   polyvinyl pyrrolidone;
   an alcohol, selected from the group consisting of isopropyl alcohol, ethanol, and benzyl alcohol; and
   methylrosanilinium chloride.

4. The ink according to claim 3, wherein a content of the polyvinyl pyrrolidone is greater than or equal to 2% and less than or equal to 12%.

5. The ink according to claim 4, wherein
   the polyvinyl pyrrolidone is a resin material involved in film formation,
   the alcohol, selected from the group consisting of isopropyl alcohol, ethanol, and benzyl alcohol, is a solvent of the resin material and is registered in Japanese Pharmacopoeia, and

TABLE 1

| Sample No. | PVP concentration (%) | Performance of marking on surgical drape | | | Filtration speed |
|---|---|---|---|---|---|
| | | Tint | speed | Blur | |
| 1 | 0 | x | x | ○ | ○ |
| 2 | 1 | Δ | x | ○ | ○ |
| 3 | 2 | Δ | Δ | ○ | ○ |
| 4 | 5 | ○ | ○ | ○ | ○ |
| 5 | 8 | ○ | ○ | ○ | Δ |
| 6 | 10 | ○ | ○ | ○ | x |
| 7 | 12 | ○ | ○ | ○ | x |
| 8 | 15 | Δ | ○ | Δ | x |

※Evaluation references

| Tint of mark on surgical drape | ○: Appropriate | Δ: Slightly pale | x: Pale |
| Smear of mark on surgical drape | ○: Little | Δ: Slightly much | x: Much |
| Blur of mark on surgical drape | ○: None | Δ: Slightly present | x: Present |
| Filtration speed | ○: Fast | Δ: Slightly slow | x: Slow |

As shown in Table 1, the comparison between the Examples of the invention of the present application (Samples Nos. 3 to 7) and Comparative Examples (Samples Nos. 1, 2, and 8), which were simultaneously tested and checked, shows that Examples were sufficiently considered the methylrosanilinium chloride is a pigment and is registered in Japanese Pharmacopoeia.

* * * * *